Sept. 20, 1949.     L. W. MUELLER     2,482,686
METER STOP
Filed June 11, 1945

Inventor
Lucien W. Mueller
By Cushman, Darby & Cushman
Attorneys

Patented Sept. 20, 1949

2,482,686

UNITED STATES PATENT OFFICE 2,482,686

METER STOP

Lucien W. Mueller, Decatur, Ill., assignor to Mueller Co., Decatur, Ill., a corporation of Illinois Application June 11, 1945, Serial No. 598,756

1 Claim. (Cl. 251—93)

The present invention relates to meter stops.

The pipe line which connects a gas main to a residence ordinarily has a gas meter connected therein, and it is customary to also place a meter stop in this line on the inlet side of the meter. The purpose of the stop is to enable the flow of gas to the meter to be cut off, but because the flow is seldom cut off except when a change of occupancy occurs, a meter stop may not be operated for a great number of years.

Because such stops are only actuated at long intervals, the plug of the stop may become seized. For that reason, the smaller end of the plug is arranged to project from the casing so that it can be tapped with a hammer to unseize it. Also, the seating surfaces of such stops are usually provided with grooves to lubricate the seating surface and to establish a seal about the smaller end of the plug. If the plug is seized, tapping its smaller end will usually release it but, at any rate, if more lubricant is then forced to the seating surface, the plug can be readily rotated.

Lubricant is usually supplied to such a stop through a lubricant cap which closes a lubricant chamber at the larger end of the stop. In the prior stops, when this cap was removed for the purpose of inspection or for replenishing the lubricant, the plug could fall from the stop and be marred. Also, a temporary but serious loss of gas could occur. In other words, the prior meter stops included no means to hold the plug firmly seated so as to provide a thorough seal when the lubricant cap was removed.

An object of the present invention is to provide means in a meter stop which will secure the plug against falling from the stop when the lubricant cap is removed and which is of optimum simplicity of design and manufacture.

Another object of the invention is to provide means which can be used to secure the plug in seated and sealed position at all times.

The provision of means to hold the plug seated at all times, and regardless of the lubricant pressure, is desirable because over a period of years the lubricant in the lubricant grooves and chamber may move into the flow line and gas may leak past the smaller end of the plug.

Another object of the invention is to provide a means which can normally hold the plug in tightly seated position but which will not prevent the plug from being unseized by a hammer blow.

Prior meter stops have included a spring positioned between the larger end of the plug and the lubricant cap. A spring positioned at that point is objectionable because when the lubricant cap is threaded inwardly to supply more lubricant to the grooves or to increase the lubricant pressure in the grooves, the spring is simultaneously placed under greater pressure. As a result, the spring may exert so much pressure that the plug is, in effect, rigidly seated. Obviously, if the spring is compressed to such an extent that its coils are in contact with each other, the plug actually is rigidly held seated by hard metal elements. Rigid contact of the larger end of the plug with the thus rigid spring is undesirable because tapping the plug under such circumstances may damage the valve and adjacent meter. Also, if a spring is provided to bear on the cap, the spring as well as the plug can fall from the valve when the cap is removed.

A further object of the invention is to provide a meter stop wherein the plug can be secured within the casing by a member formed of relatively soft material and which will not prevent the plug from being unseized by a light tapping blow.

Other objects and advantages of the invention will be apparent from the following specification and accompanying drawing, wherein—

Figure 1:
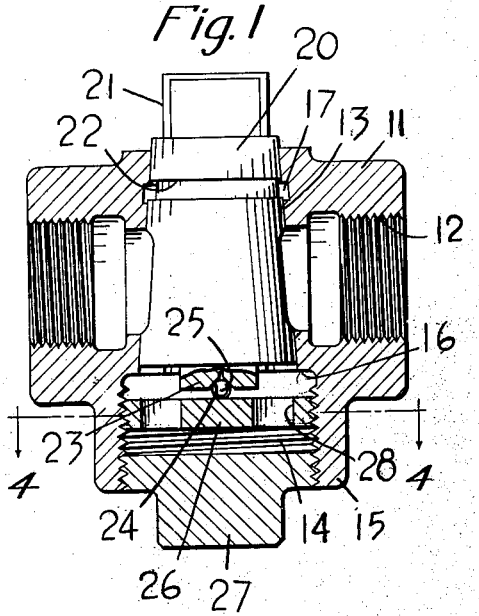
Figure 1 is a central axial section through the valve of the present invention.
Figure 2:
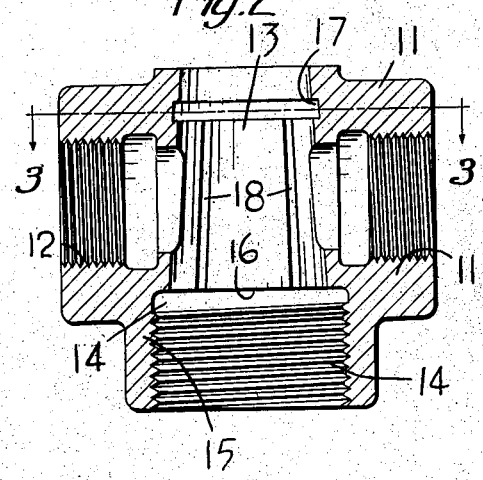
Figure 2 is a central axial section through the casing included in the invention.
Figure 3:
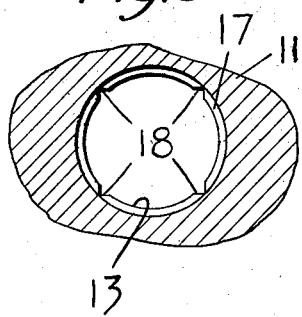
Figure 3 is a transverse section on the line 3—3 of Figure 2.
Figure 4:
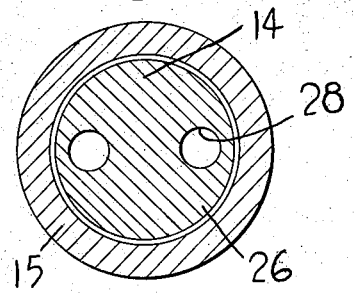
Figure 4 is a transverse section on the line 4—4 of Figure 1.

The stop of the invention comprises a casing 11 including a flow passageway 12 and a tapered seat 13 extending transversely to the flow passageway. The smaller end of the seat 13 opens to the exterior of the casing and its larger end opens to a lubricant chamber 14 formed by an annular flange-like extension 15 on the casing 11. The larger end of the seating surface 13 is defined by a shoulder 16 facing into the lubricant chamber 14.

The seat 13 includes a circumferential lubricant groove 17 positioned between the smaller end of the seat and the ports of the flow passageway 12. Four longitudinally extending grooves 18 are equi-distantly spaced about the seating surface 13, two of these grooves being provided between each mouth of the flow passageway. The grooves 18 extend from the circumferential groove 17 to the shoulder 16 to open to the lubricant chamber.

A tapered plug 20 including an operating shank 21 is positioned in the seat 13, the plug including a flow port. A circumferentially extending groove 22 is formed in the plug 20 between the smaller end of the plug and the flow port. As illustrated in Figure 1, the circumferential groove 22 is opposite the circumferential groove 17 of the casing when the plug is in seated or generally seated position in the casing.

The plug 20 is provided with a central boss 23 at its larger end, the boss having sufficient length axially of the plug that it will extend beyond the shoulder 16 when the plug is in its innermost seated position. The outer end of the boss 23 is shown in central section in Figure 1 and it will be observed that its outer surface includes a small socket 24 in which a ball 25 is positioned. The ball bears on a disc or plug securing element 26 provided with threads on its periphery whereby it engages threads on the wall of the lubricant chamber 14. The lubricant cap 27 engages these same threads on the chamber wall. Disc 26 is apertured as indicated at 28 at points between its center and periphery so that lubricant may freely move through the disc. These apertures also enable the disc to be engaged by a spanner for rotation.

In accordance with customary practice, the plug 20 is formed of brass or metal of similar hardness, while the casing 11 and lubricant cap 27 are formed of iron or brass. Ball 25 is of hardened steel and disc 26 is of soft steel, or the disc may be formed of brass. In any event, for the reasons hereinafter set forth, disc 26 is of softer material than the ball 25.

In the use of the stop, the lubricant chamber 14 may be filled with lubricant after removal of the cap 27. During this operation the plug securing disc 26 will prevent the plug from falling from the casing. When the cap is again threaded into the lubricant chamber, the grease can be placed under pressure. As a result, lubricant will be forced into the grooves 18, 17 and 22 and the plug will be urged to a tightly seated position. The plug securing element 26 may then be threaded into sufficiently tight engagement with the anti-friction ball 25 to hold the plug seated and sealed even though, in the course of time, lubricant may be lost to the flow line. Such loss can occur over the long period in which a meter stop may be left unoperated and uninspected.

If the stop is to be operated after a number of years and the operator finds the plug seized, he may tap the exposed small end of the plug to unseize it. Because disc 26 is of softer material than ball 25, the latter may readily move into the disc to thereby enable the plug to move downward with the hammer blow. Therefore, no substantial jar will be transmitted to the meter.

Either before or after the tapping operation the operator may rotate the cap 27 inwardly to force more lubricant into the grooves. In any event, after a meter stop plug has been tapped and rotated to the desired position, the operator usually removes the lubricant cap to inspect the grease in the lubricant chamber and, if necessary, replenish it. When he does this with the present stop, he may insert a spanner in the apertures 28 of disc 26 to thread it firmly against ball 25 and thereby take up play created by any marked denting of the disc 26 occasioned by the tapping action. However, insertion of additional lubricant and inward threading of the cap can frequently be relied upon to hold the plug seated.

Aside from the fact that the structure of the present invention insures that the plug will be held firmly seated, cannot fall from the casing, and that the meter cannot be damaged by a tapping blow upon the plug, it will be observed that movement of the cap 27 to increase the pressure on the lubricant cannot affect the disc 26 as is the case if a spring is seated on the cap.

In addition to the above advantages resulting from the use of the present valve, numerous manufacturing advantages result from its design. For example, a single threading action produces the threads on the wall of chamber 14. Since no spring or other element bears on the inner surface of cap 27, that surface need not be machined smooth. The socket 24 is formed in the boss 23 prior to turning the seating surface on the plug and is a simple and standard operation always performed and which the present invention places to a new use. Because ball 25 projects from this socket and past the outer wall of the boss to contact with disc 26, it is not necessary to machine the outer surface of boss 23 or its side surfaces. That is, since the outer surface of the boss will not contact with the disc, that surface need not be machined. Obviously, if a spring were centered on the boss, it would be necessary to machine its side surfaces as well as the inner surface of the lubricant cap.

The provision of the ball 25 enables the plug to be turned in either direction without rotating the disc. Naturally, if the plug could rotate the disc, the plug could become locked in one position. No rotation of cap 27 can affect disc 26.

It will be understood that various arrangements of lubricant grooves can be used.

The terminology used in the specification is for the purpose of description and not of limitation, the scope of the invention being defined in the claim.

I claim:

In a valve, a casing including a flow passageway and a tapered seat extending transversely of the passageway, a tapered plug including a flow port and positioned in the casing seat, the plug having its smaller end projecting from the casing, the casing being provided with a threaded bore extending axially from the larger end of the casing seat to the exterior of the casing and providing a lubricant chamber, lubricant grooves in the seating surface, an apertured disc threaded in the inner portion of the threaded bore, the larger end of the plug being provided with a central socket, an anti-friction ball positioned in the socket of the plug and bearing on said disc, the disc being of softer material than the ball, and a cap threaded in the outer end of the threaded bore independently of the disc to close the lubricant chamber and whereby lubricant in the chamber can be placed under pressure.

LUCIEN W. MUELLER.

REFERENCES CITED

The following references are of record in the file of this patent:

UNITED STATES PATENTS

| Number | Name | Date |
|---|---|---|
| 1,365,116 | Martin | Jan. 11, 1921 |
| 1,932,322 | Nordstrom | Oct. 24, 1933 |